United States Patent
Frascati et al.

(10) Patent No.: US 9,384,522 B2
(45) Date of Patent: Jul. 5, 2016

(54) REORDERING OF COMMAND STREAMS FOR GRAPHICAL PROCESSING UNITS (GPUS)

(71) Applicant: QUALCOMM Incorporated, San Diego, CA (US)

(72) Inventors: Christopher Paul Frascati, Oviedo, FL (US); Avinash Seetharamaiah, Chuluota, FL (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 13/776,067

(22) Filed: Feb. 25, 2013

(65) Prior Publication Data

US 2014/0184623 A1 Jul. 3, 2014

Related U.S. Application Data

(60) Provisional application No. 61/746,963, filed on Dec. 28, 2012.

(51) Int. Cl.
  *G06T 1/20* (2006.01)
  *G06T 15/00* (2011.01)
  *G09G 5/36* (2006.01)
(52) U.S. Cl.
  CPC .................. *G06T 1/20* (2013.01); *G06T 15/005* (2013.01); *G09G 5/363* (2013.01)
(58) Field of Classification Search
  USPC ........................................................ 345/522
  See application file for complete search history.

(56) References Cited

U.S. PATENT DOCUMENTS

| 5,896,139 A | 4/1999 | Strauss |
| 6,631,423 B1 | 10/2003 | Brown et al. |
| 7,095,416 B1 | 8/2006 | Johns et al. |
| 7,450,131 B2 | 11/2008 | Swamy et al. |
| 7,698,534 B2 | 4/2010 | Perfetta |
| 2002/0080143 A1 | 6/2002 | Morgan et al. |
| 2005/0231514 A1* | 10/2005 | Harper et al. ................. 345/501 |
| 2008/0055322 A1 | 3/2008 | Ryan et al. |
| 2008/0158236 A1* | 7/2008 | Bakalash et al. ............. 345/506 |
| 2009/0278842 A1 | 11/2009 | Peterfreund |
| 2012/0306899 A1* | 12/2012 | Sandmel et al. ............... 345/522 |

OTHER PUBLICATIONS

Capin, T., et al., "The State of the Art in Mobile Graphics Research", IEEE Computer Graphics and Applications, vol. 28, No. 4, Jul. 1, 2008, XP011229506, IEEE Service Center, New York, NY, US ISSN: 0272-1716, pp. 74-84.
Hirzel, et al., "A Catalog of Stream Processing Optimizations", IBM Research Report, Sep. 28, 201, XP002719885, Retrieved from the Internet: URL:http://hirzels.com/martin/papers/tr11-rc25215-opt-catalog.pdf [retrieved on Feb. 6, 2014], pp. 1-30.
International Search Report and Written Opinion—PCT/US2013/068709—ISA/EPO—Feb. 24, 2014.
International Preliminary Report on Patentability from International Application No. PCT/US2013/068709, dated Feb. 25, 2015, 8 pps.

* cited by examiner

*Primary Examiner* — Barry Drennan
*Assistant Examiner* — Terrell Robinson
(74) *Attorney, Agent, or Firm* — Shumaker & Sieffert, P.A.; James R. Gambale, Jr.

(57) ABSTRACT

In general, techniques are described for analyzing a command stream that configures a graphics processing unit (GPU) to render one or more render targets. A device comprising a processor may perform the techniques. The processor may be configured to analyze the command stream to determine a representation of the one or more render targets defined by the command stream. The processor may also be configured to, based on the representation of the render targets, and identify one or more rendering inefficiencies that will occur upon execution of the command stream by the GPU. The processor may also be configured to re-order one or more commands in the command stream so as to reduce the identified rendering inefficiencies that will occur upon execution of the command stream by the GPU.

36 Claims, 5 Drawing Sheets

REORDERING OF COMMAND STREAMS FOR GRAPHICAL PROCESSING UNITS (GPUS)

This application claims the benefit of U.S. Provisional Patent Application No. 61/746,963, filed Dec. 28, 2012, the entire content of which is incorporated herein by reference.

TECHNICAL FIELD

This disclosure relates to graphical processing units (GPUs) and, more particularly, to graphics drivers for interfacing with a GPU.

BACKGROUND

A device that processes content for visual presentation generally includes a graphics processing unit (GPU). The GPU renders pixels that are representative of the content on a display. The GPU generates one or more pixel values for each pixel on the display and performs graphics processing on the pixel values for each pixel on the display to render each pixel for presentation.

SUMMARY

In general, this disclosure describes techniques in which a device display interface (DDI) stream optimizer reorders commands in DDI streams so as to remove what may be referred to as "sub-optimal" ordering of commands in the DDI stream. The techniques may enable a graphics driver to process the DDI stream received from the operating system to generate a scene graph in real-time or near-real-time. The scene graph may represent a graph data structure, in one example, that includes nodes representative of the render target having links, which may be referred to as "edges." The links can identify dependencies between nodes, which represent the render targets. The graphics driver may buffer the DDI stream in real-time or near-real-time and generate the scene graph based on the buffered DDI stream. The graphics driver may then analyze the graph to identify any inefficiency that may impact GPU performance when executing the commands of the DDI stream, thereby potentially improving rendering efficiency (in terms, as one example, of loading state and other data necessary to render a frame or tile).

In one example, a method for analyzing a command stream that configures a graphics processing unit (GPU) to render one or more render targets, the method comprise analyzing the command stream to determine a representation of the one or more render targets defined by the command stream and, based on the representation of the render targets, identifying one or more rendering inefficiencies that will occur upon execution of the command stream by the GPU. The method may further comprise re-ordering one or more commands in the command stream so as to reduce the identified rendering inefficiencies that will occur upon execution of the command stream by the GPU.

In another example, a device configured to analyze a command stream that configures a graphics processing unit (GPU) to render one or more render targets, the device comprises one or more processors configured to analyze the command stream to determine a representation of the one or more render targets defined by the command stream, based on the representation of the render targets, identify one or more rendering inefficiencies that will occur upon execution of the command stream by the GPU, and re-order one or more commands in the command stream so as to reduce the identified rendering inefficiencies that will occur upon execution of the command stream by the GPU.

In another example, a device configured to analyze a command stream that configures a graphics processing unit (GPU) to render one or more render targets, the device comprises means for analyzing the command stream to determine a representation of the one or more render targets defined by the command stream. The device may also comprise means for, based on the representation of the render targets, identifying one or more rendering inefficiencies that will occur upon execution of the command stream by the GPU, and means for re-ordering one or more commands in the command stream so as to reduce the identified rendering inefficiencies that will occur upon execution of the command stream by the GPU.

In another example, a non-transitory computer-readable storage medium has stored thereon instructions that, when executed cause, one or more processors to analyze the command stream to determine a representation of the one or more render targets defined by the command stream, based on the representation of the render targets, identify one or more rendering inefficiencies that will occur upon execution of the command stream by the GPU, and re-order one or more commands in the command stream so as to reduce the identified rendering inefficiencies that will occur upon execution of the command stream by the GPU.

The details of one or more examples are set forth in the accompanying drawings and the description below. Other features, objects, and advantages will be apparent from the description and drawings, and from the claims.

DETAILED DESCRIPTION

Figure 1:
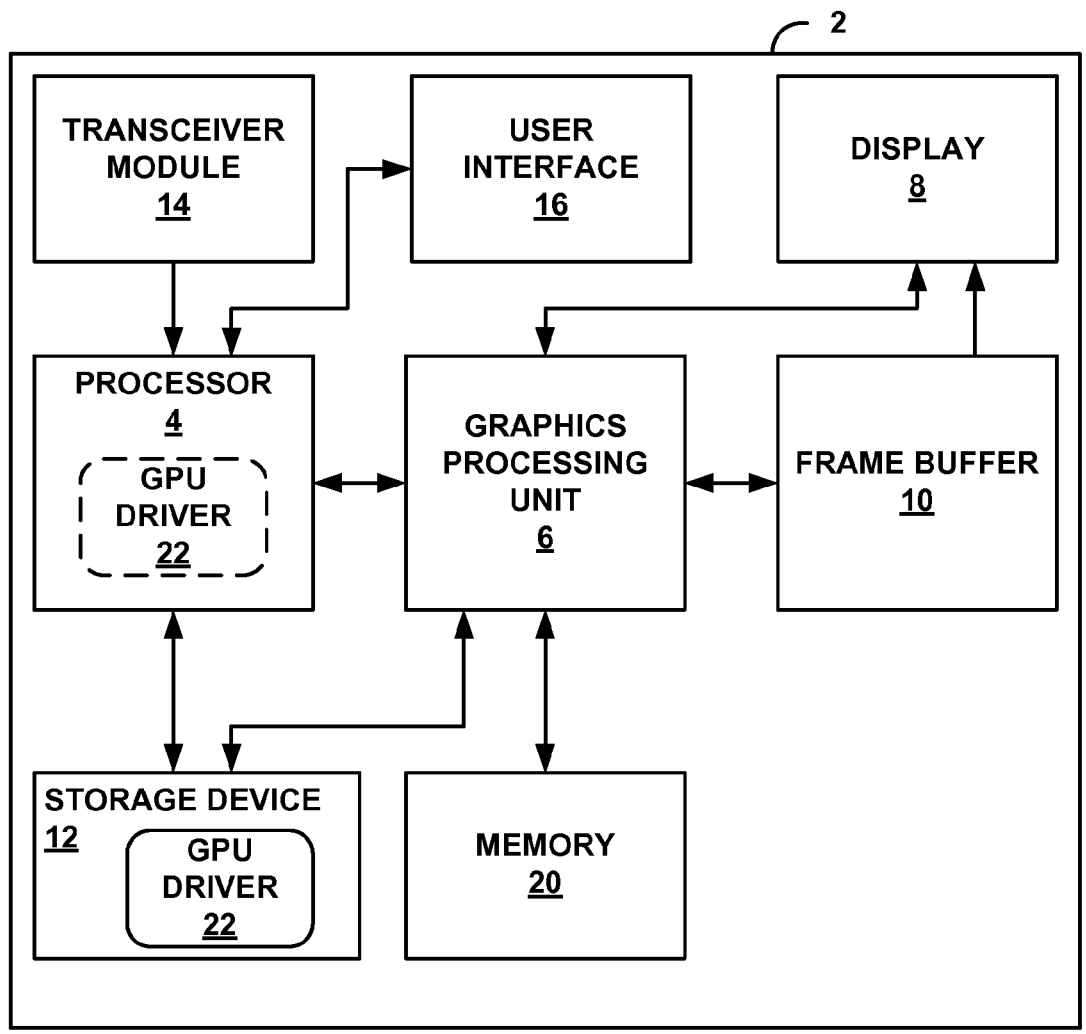
FIG. 1 is a block diagram illustrating a device that may be configured to perform aspects of the techniques described in this disclosure.

FIG. 1 is a block diagram illustrating a device 2 that may be configured to perform aspects of the techniques described in this disclosure. Examples of device 2 include, but are not limited to, wireless devices, mobile or cellular telephones, including so-called smartphones, personal digital assistants (PDAs), video gaming consoles that include video displays, mobile video gaming devices, mobile video conferencing units, laptop computers, desktop computers, television set-top boxes, tablet computing devices, e-book readers, fixed or mobile media players, or another device that includes graphic processing capabilities. Device 2 may include processor 4, graphics processing unit (GPU) 6, display 8, frame buffer 10, storage device 12, transceiver module 14, user interface 16 and memory 18. Device 2 may also include additional modules or units, which are not shown in FIG. 1 for ease of illustration. For example, device 2 may include a speaker and a microphone, neither of which are shown in FIG. 1, to effectuate telephonic communications in examples where device 2 is a cellular wireless handset. Furthermore, some of the modules and units shown in device 2 may not be necessary in some examples. For example, user interface 16 and display 8 may be external to device 2 in examples where device 2 represents a desktop computer.

Processor 4 may execute one or more applications. Examples of the applications include web browsers, e-mail applications, spreadsheets, video games, audio and/or video capture, playback or editing applications, word processing applications, video or picture rendering applications, computer aided design (CAD) programs, or any other applications that initiate the generation of image data to be presented via display 8. The one or more applications may be stored within storage device 12. In some instances, processor 4 may download the one or more applications via transceiver module 14. Processor 4 may execute the one or more applications based on a selection by a user via user interface 16. In some examples, processor 4 may execute the one or more applications without requiring any user interaction.

Examples of processor 4 include, but are not limited to, a digital signal processor (DSP), general purpose microprocessor, application specific integrated circuit (ASIC), field programmable logic array (FPGA), or other equivalent integrated or discrete logic circuitry. Storage device 12 may comprise one or more computer-readable storage media. Examples of storage device 12 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be executed by a computer or a processor. In some aspects, storage device 12 may include instructions that cause host processor 4 and/or GPU 6 to, when executed, perform the functions ascribed to host processor 4 and GPU 6 in this disclosure.

In general, GPU 6 may perform various functions on the pixels for presentment on display 8. For example, GPU 6 may perform functions such as shading, blending, illuminating, and others to generate pixel values for the pixels to be displayed on display 8. Examples of GPU 6 include, but are not limited to, a DSP, general purpose microprocessor, ASIC, FPGA, or other equivalent integrated or discrete logic circuitry. GPU 6 may comprise a single-core or multi-core processor and may include one or more graphics processing pipelines, which may be configured to operate according to OpenGL, OpenCL, DirectX 11 or the like. Although shown as separate in FIG. 1, in some examples, processor 4 may include GPU 6. For example, processor 4 and GPU 6 may be formed within the same DSP, general purpose microprocessor, ASIC, FPGA, or other equivalent integrated or discrete logic circuitry. In other examples, processor 4 may serve as an application processor that directs GPU 6 to perform various graphics processing operations. Although one GPU 6 is illustrated in FIG. 1, aspects of this disclosure are not so limited. In some examples, device 2 may include a plurality of GPUs or GPU cores, similar to GPU 6. The graphics processing tasks may be split among these GPUs or GPU cores.

Display 8 may comprise a liquid crystal display (LCD), an organic light emitting diode (OLED) display, a cathode ray tube (CRT) display, a plasma display, a projector, or another type of display device. Display 8 includes a plurality of pixels arranged horizontally and vertically in a 2D pixel array. Each pixel of display 8 may be identifiable by its 2-D coordinate, e.g., (x, y) in Cartesian coordinates. For example, the pixel located at the top-left corner of display 8 may be identified as the pixel located at (0, 0). The pixel immediately to the right of the pixel located at (0, 0) may be identified as the pixel located at (1, 0). The pixel immediately below the pixel located at (0, 0) may be identified as the pixel located at (0, 1). All the pixels of display 8 may be similarly identified. The Cartesian coordinates described above are described for illustration purposes only. The pixels of display 8 may be identifiable by different types of coordinate systems, e.g., polar coordinates, bipolar coordinates, parabolic coordinates, and the like. Furthermore, the example locations of the pixels are also described for illustration purposes only. In some examples, the pixel located at (0, 0) may be at the bottom-left, top-right, bottom-right, or any other pixel location of display 8.

Frame buffer 10 may represent a two-dimensional buffer that includes a plurality of storage locations. The number of storage locations within frame buffer 10 may be substantially similar to the number of pixels to be displayed on display 8. For example, if display 8 is configured to include 640×480 pixels, frame buffer 10 may include 640×480 storage locations. Frame buffer 10 may store the final pixel values for each of the pixels processed by GPU 6. Display 8 may retrieve the final pixel values from frame buffer 10, and display the final image based on the pixel values stored in frame buffer 10.

Storage device 12 may, in some examples, be considered as a non-transitory storage medium. The term "non-transitory" may indicate that the storage medium is not embodied in a carrier wave or a propagated signal. However, the term "non-transitory" should not be interpreted to mean that storage device 12 is non-movable. As one example, storage device 12 may be removed from device 2, and moved to another device. As another example, a storage device, substantially similar to storage device 12, may be inserted into device 2. In certain examples, a non-transitory storage medium may store data that can, over time, change (e.g., RAM).

Transceiver module 14 may represent a module by which device 2 may transmit and receive data. Transceiver module 14 may also be generally referred to as an interface. In this respect, transceiver module 14 may include circuitry to allow wireless or wired communication between device 2 and another device or a network. Transceiver module 14 may include modulators, demodulators, amplifiers and other such circuitry for wired or wireless communication, which are not shown in the example of FIG. 1 for ease of illustration purposes. Additionally, or alternatively, transceiver module 14 may include one or more network adapter units, e.g., to permit communication via a wired or wireless network.

User interface 16 represents hardware or a combination of hardware and software with which a user of device 2 interfaces to interact with device 2. Examples of user interface 16 include, but are not limited to, a trackball, a mouse, a keyboard, and other types of input devices. User interface 16 may also be a touch screen and may be incorporated as a part of display 8.

As noted above, processor 4 may execute one or more applications that generate image data. In some instances, upon execution of the one or more applications, processor 4 may generate a command stream defining a plurality of primitives to be rendered by GPU 6. The primitives are typically the basic building blocks for graphics rendering and may comprise a line (including a curve, a spline, or other type of line), a point, a circle, an ellipse, a polygon (where, in some examples the polygon is defined as a collection of one or more triangles) or any other shape defining a two-dimensional (2D) primitive. The term "primitive" may also refer to three-dimensional (3D) primitives, such as cubes, cylinders, spheres, cones, pyramids and torus, to name a few examples of 3D primitives. Generally, the term "primitive" refers to any basic geometric shape or element capable of being rendered by GPU 6 for display as an image (or frame in the context of video data) via display 8.

The command stream may define primitives in order to form one or more 2D and/or 3D objects. Thus, the term "object" refers to one or more primitives, which may be combined to represent an item, animal, person or structure, to name a few examples of objects. The command stream may also define state data, which may be associated with one or more primitives and/or objects (which again may refer to a collection of one or more primitives). State data may define, for example, a color, texture or other aspect of the primitives. State data may additionally refer to cameras, lights (or lighting) and other ambient or contextual data that may impact rendering of the primitives. Considering state data defining a camera for purposes of further illustration, this state data may define a location of the camera with respect to the primitives, a zoom or magnification of the camera, presence and type of camera filters, camera orientation and other aspects associated with capturing an image or video via a camera. Typically, the command stream defines both the primitives and the state data in a 3D model space having an x-axis, a y-axis and a z-axis.

In response to receiving this command stream, GPU 6 may transform the primitives and state data into a world space by applying one or more model transforms (which may also be specified in the state data). Once transformed, GPU 6 may apply a view transform for the active camera (which again may also be specified in the state data defining the camera) to transform the coordinates of the primitives and lights into the camera or eye space. GPU 6 also performs vertex shading to render the appearance of the primitives in view of any active lights. GPU 6 may perform vertex shading in one or more of the above model, world or view space (although its commonly performed in the world space).

Once the primitives are shaded, GPU 6 may perform projections that project the image into a unit cube with extreme points, as one example, at (−1, −1, −1) and (1, 1, 1). The unit cube is commonly referred to as a canonical view volume. After transforming the model from the eye space to the canonical view volume, GPU 6 may perform clipping to remove any primitives that do not at least partially reside within the view volume. In other words, GPU 6 may remove any primitives that are not within the frame of the camera. GPU 6 may then map the coordinates of the primitives from the view volume to the screen space, effectively reducing the 3D coordinates of the primitives to the 2D coordinates of the screen.

Given the transformed and projected vertices defining the primitives or objects with their associated shading data, GPU 6 may then rasterize the primitives, typically meaning that GPU 6 computes and sets colors for the pixels of the screen covered by the objects. During rasterization, GPU 6 may apply any textures associated with the primitives (where textures may comprise state data). GPU 6 may also perform a Z-buffer algorithm, also referred to as a depth test, during rasterization to determine whether any of the primitives and/or objects are occluded by any other objects. The Z-buffer algorithm sorts primitives according to their depth so that GPU 6 knows the order in which to draw each primitive to the screen. GPU 6 outputs rendered tiles to frame buffer 10. Once GPU 6 outputs all of the rendered tiles to form the rendered image (which may also be referred to as "rendered image data"), display 8 may retrieve and display this image for consumption by a user of device 2.

While frame buffer 10 is shown in the example of FIG. 1 as separate from off-chip memory 20, frame buffer 10 may be incorporated into or stored within memory 20. That is, frame buffer 10 may consume some portion of memory 20 or memory 20 may reserve some amount of space for a dedicated frame buffer 10. Thus, while frame buffer 10 is shown as being separate from memory 20 in the example of FIG. 1, the techniques may be implemented with respect to frame buffers that are included within memory 20 or any other implementation of a frame buffer, whether separate from or included within an off-chip or on-chip memory.

Traditionally, early GPUs were often implemented for wired computing devices, such as desktop computers, workstations, servers and the like, due to their computational complexity and the accompanying power required to operate these computationally complex GPUs. These early GPUs usually conformed to an architecture referred to as a direct render architecture. In a direct render architecture, the GPU directly renders an entire image, often consuming significantly more memory bus bandwidth and potentially resulting in more overdraw (as the back-most objects depth-wise are rendered first but may be occluded later when more objects that are closer to the point of view or camera are drawn over portions of the back-most objects).

Development of fabrication techniques alongside with significant growth in GPU architectures have resulted in GPUs that feature lower-power operation. These lower-power GPUs are desirable in mobile computing devices, such as cellular phones or handsets (including so-called "smart phones"), laptop computers, tablet or slate computers, personal digital assistants, portable gaming devices, portable entertainment or media devices, electronic readers ("e-readers"), and other devices that operate on battery power.

In these mobile devices (which may be considered as one example of power-limited devices in that they rely on batteries that may expire over time and/or require recharging), the GPUs typically expend some portion of the mobile device's available power in performing off-chip memory accesses to retrieve state data and power on-chip memory to store this state data. Off-chip memory in the context of device 2 may refer to memory 20, which is external to the chip (meaning, GPU 6 in the example of FIG. 1) and hence off-chip with respect to GPU 6. Although not shown in the example of FIG. 1, GPU 6 may include on-chip memory, which refers to memory that is internal to GPU 6. Accessing off-chip memory 20 typically requires power to power the bus connecting GPU 6 to memory 20 so that the state and primitive data may be retrieved and/or stored. Large on-chip memories may require larger amounts of power to operate in comparison to smaller on-chip memories.

To offset some of these power concerns, these so-called "low-power GPUs" (which may also be referred to as "mobile GPUs") are being developed that implement what may be referred to as a "tile-based" or "bin-based" architecture. In a tile-based (which may also be referred to as "binning-based") architecture, the GPU divides the image (which may comprise a three-dimensional (3D) scene) into smaller parts. These smaller parts may be referred to as "tiles" or "bins." The GPU then may process the tiles or bins individually. Binning or tiling in this manner may require consumption of less bandwidth on a memory bus connecting the GPU to off-chip memory, as state data and other data for only a portion of the image or scene, i.e., the tiles, needs to be retrieved rather than having to retrieve this state or other data for an image as a whole.

Typically, software developers are accustomed to developing software for direct render GPUs customarily present in desktop environments that having generally unlimited access to power. That is, software deployed for execution on desktop environments is not typically designed to conserve power, due to the nearly unlimited power supply available to desktop computers. However, given the emergence of mobile computing and, particularly, so-called "smart phones" that have limited power supplies (e.g., such as a power limited rechargeable batteries), these mobile devices have begun to adopt tile-based GPUs so as to increase GPU performance in some aspects, including power utilization. Software developers accustomed to designing software for direct render GPUs have not generally adapted their direct render programming techniques to accommodate tile-based GPUs. As a result, current software may not be optimized for tile-based GPUs.

To illustrate, application software executing on a CPU may issue commands to the GPU via a device driver, which is shown in the example of FIG. 1 as "GPU driver 22." Both storage device 12 and processor 4 include GPU driver 22 to reflect that GPU driver 22 may be stored, as a software program or segment thereof, to storage device 12 and executed by processor 4. Processor 4 loads GPU driver 22 upon execution of the operating system so as to be able to interface with GPU 6. Typically, processor 4 executes GPU driver 22 so as to interface with GPU 6 by way of the above referenced commands. GPU driver 22 may define functions that other software (such as an operating system ("OS") executed by processor 6) may invoke via the above referenced commands to interface with GPU 6.

These commands may arrive at the driver via a device driver interface (DDI), which is a private interface between the operating system and GPU driver 22. The commands may form a DDI stream, where the stream may specify one or more objects. These objects may have rendering dependencies, where rendering of one object (which may be referred to as "object A" for purposes of reference) may impact rendering of another object (which may be referred to as "object B" for purposes of reference). In some instances, however, these objects may not have rendering dependencies but the software developer may alter object A, object B and then object A again. In a direct rendering GPU, switching between unrelated objects that do not have rendering dependencies does not overly impact the performance of the GPU because all objects are rendered at once and not on a per-tile basis.

However, in tile-based GPUs, the switching between objects may require that all of the corresponding states for objects to be stored in on-chip GPU memory (which may be referred to as "local memory"), as a result of how tile-based architectures perform the rendering process. Thus, to switch from object A to object B, the tile-based GPU may need to unload all states associated with object A from the on-chip memory to off-chip memory, such as memory 20, and the load all states associated with object B from the off-chip memory to the on-chip memory. Then, to switch from object B to object A, the tile-based GPU unloads all states associated with object B from the on-chip memory to the off-chip memory and loads all states associated with object A to the on-chip memory from the off-chip memory. In this example, the DDI stream may define commands for switching so-called rendering targets, e.g., from object A to object B, and then back again, e.g., from object B back to object A, without defining any dependencies between objects A and B. Such switching may not directly impact rendering GPU performance but may substantially impact the performance of tile-based GPUs.

In accordance with the techniques described in this disclosure, GPU driver 22 may be configured to use a "DDI stream optimizer" that may reorder commands in DDI streams so as to remove sub-optimal ordering of commands in the DDI stream. In other words, the techniques may enable GPU driver 22 to process the DDI stream received from the operating system to generate a scene graph in real-time or near-real-time. The scene graph may represent a graph data structure, in one example, that includes nodes representative of the render target having links (which may be referred to as "edges") identifying the dependencies between nodes (which represent the render targets). GPU driver 22 may buffer the DDI stream in real-time or near-real-time and generate the scene graph based on the buffered DDI stream. GPU driver 22 may then analyze the graph to identify any inefficiency that may impact GPU performance when executing the commands of the DDI stream.

In operation, GPU driver 22 may analyze the command stream to determine a representation of the one or more render targets defined by the command stream. This representation may comprise a graph data structure including nodes that represent the render targets (which may refer to objects) and edges that represent the dependencies between the render targets. Based on the representation of the render targets, GPU driver 22 may identify one or more rendering inefficiencies that will occur upon execution of the command stream by the GPU. GPU driver 22 may, in some instances, traverse the graph data structure to identify the one or more rendering inefficiencies that will occur upon execution of the command stream by GPU 6. GPU driver 22 may next re-order one or more commands in the command stream so as to reduce the identified inefficiencies that will occur upon execution of the command stream by GPU 6. GPU 6 may then execute the re-ordered command stream to render one or more images, one or more scenes or one or more frames.

In other instances, GPU driver 22 may, based on the representation of the render targets, determine whether to execute the command stream in a direct rendering mode or a tile-based rendering mode with GPU 6. GPU driver 22 may perform some analysis, for example, of the graph data structure to determine whether there are a number of large objects, which may result in substantial overdraw should GPU 6 perform direct rendering. GPU driver 22 may then determine, when there are a number of large objects, to render the scene using a tile-based rendering mode. GPU driver 22 may then configure GPU 6 to operate in the tile-based rendering mode. GPU 6 may then execute the command stream in the determined rendering mode.

While described above as analyzing a command stream associated with a single frame to be rendered by GPU 6, the techniques may be performed with respect to command streams associated with multiple frames to be rendered by GPU 6. That is, GPU driver 22 may analyze command streams associated with two or more frames to be rendered by GPU 6. In some examples, GPU driver 22 may use scene complexity or other metrics related to rendering inefficiencies identified in a command stream associated with a previous frame when determining whether rendering inefficiencies will occur when GPU 6 renders a command stream for the current frame. Likewise, GPU driver 22 may determine whether to execute a command stream associated with a current frame in either a direct or tile-based rendering mode based on whether a command stream associated with a previous frame was rendered according to the direct or tile-based rendering mode.

Additionally, GPU driver 22 may, when no inefficiencies are identified based on the graph data structure, disable the analysis of the command stream, disable the identification of the one or more rendering inefficiencies and disable the re-ordering of the one or more commands in the command stream. In other words, GPU driver 22 may adaptively determine when to perform the techniques described in this disclosure based on previous application of the techniques described in this disclosure. In some instances, GPU driver 22 may create application profiles, where GPU driver 22, based on previous application of the optimizing techniques described in this disclosure with respect to a particular application, stores a preference for performing the optimization techniques. Thus, for applications developed and/or optimized for a tile-based GPUs, such as GPU 6, GPU driver 22 may "learn" of this optimization based on a previous application of the optimization techniques and store this learned information to an application profile as described below in more detail. When receiving commands from the OS executing the application, GPU driver 22 may access this application profile and determine, based on this profile, whether to enable analysis of the command stream and subsequent aspects of the techniques.

Figure 5:
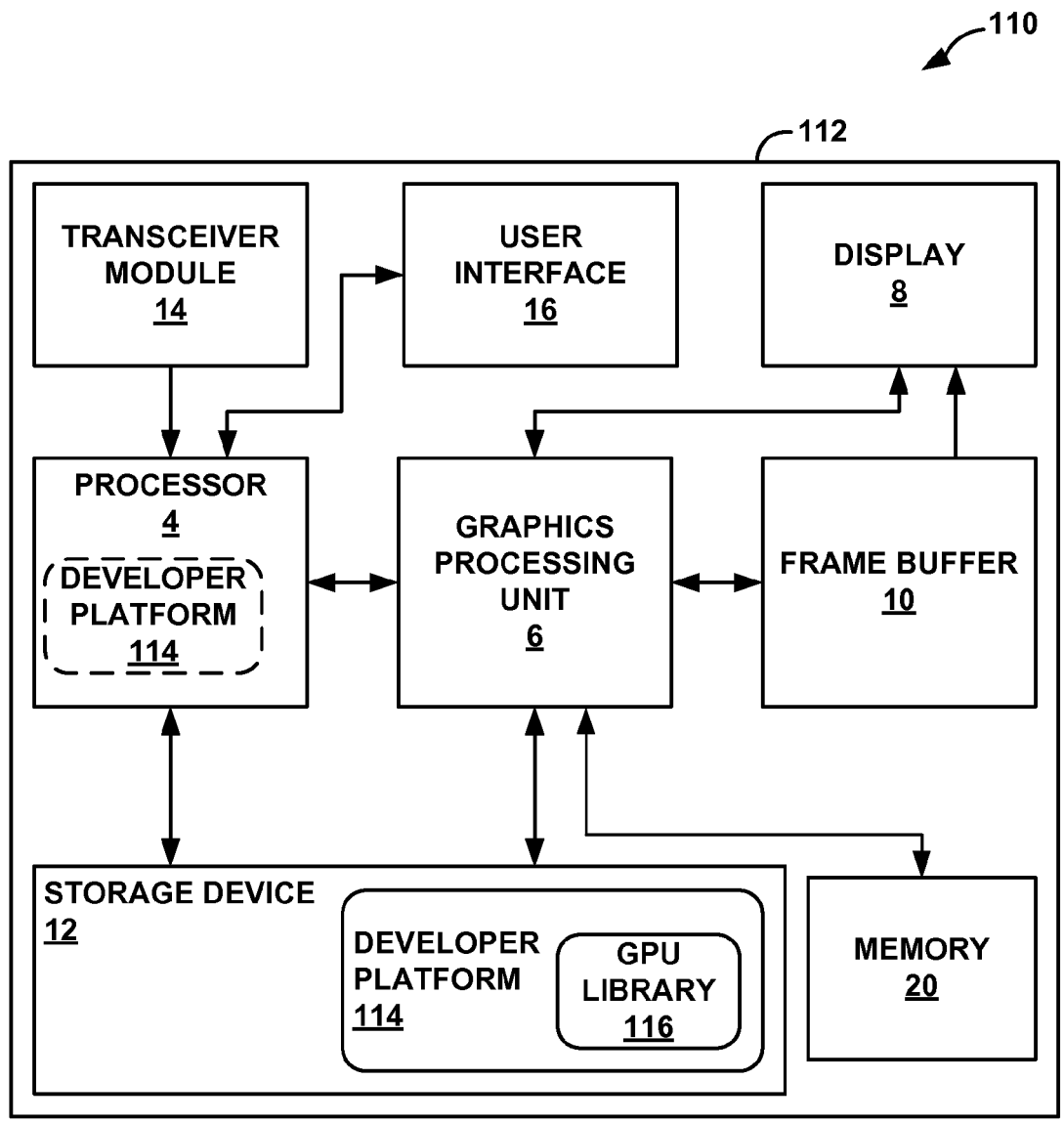
FIG. 5 is a block diagram illustrating a developer environment that may perform the techniques described in this disclosure.

In some instances, the techniques may be deployed in a developer environment, which is described in more detail with respect to FIG. 5. That is, the techniques may be implemented as a shared library that is incorporated into a development environment, and/or into a graphics driver deployed for mobile and other computing devices. The shared library may, in the developer context, generate one or more notifications alerting a user of the identified one or more inefficiencies so that developers may become more aware of these inefficiencies. The notification may also alert a user as to whether it is more beneficial to use a direct render mode or a tile-based render mode.

In this manner, the techniques described in this disclosure may not only promote improved rendering by GPUs that support tile-based rendering modes (e.g., GPU 6), but may also educate developers of better ways to code applications that utilize GPUs that support tile-based rendering modes. The techniques may therefore promote improved rendering efficiencies both pro-actively (e.g., during the application development process) and reactively (e.g., during execution of the application). In some instances, the techniques may adaptively (meaning, without requiring direct user intervention) perform this rendering target analysis on an application-by-application basis using the before mentioned profiles. Thus, where pro-active tile-based application development has resulted in few to any tile-based rendering inefficiencies, the techniques may adaptively disable post-development tile-based rendering analysis to promote reduced power consumption and reduced rendering delay.

Although described with respect to mobile or low-power GPUs, the techniques of this disclosure may be implemented with respect to any tile-based GPU, including high-power GPUs developed for devices that may be considered as having access to large amounts of power (in the sense that they do not receive power from a battery but from a wired or potentially wireless power source). The techniques should therefore not be limited to the examples described in this disclosure.

Figure 2:
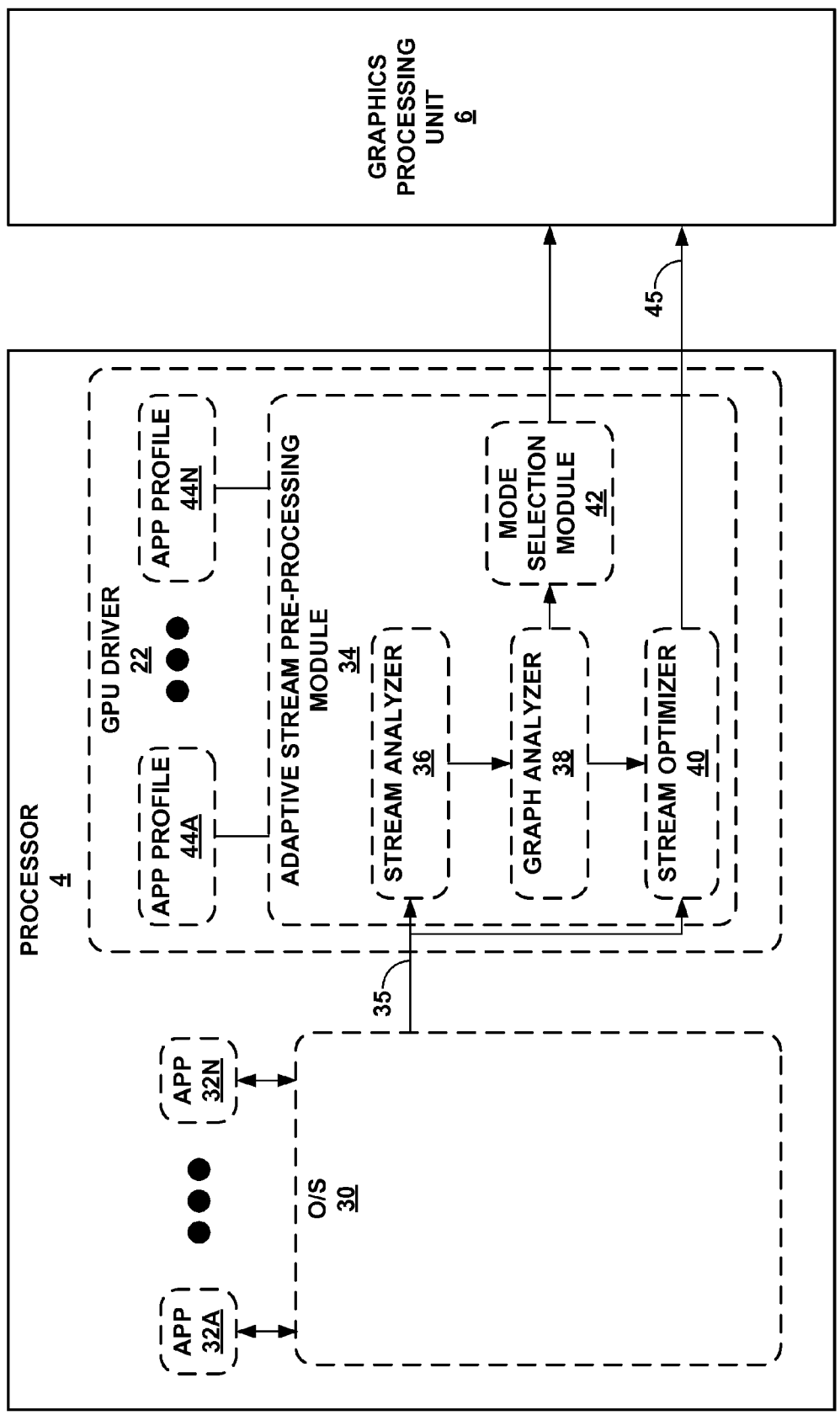
FIG. 2 is a block diagram illustrating processor and graphics processing unit shown in the example of FIG. 1 in more detail.

FIG. 2 is a block diagram illustrating processor 4 and graphics processing unit 6 shown in the example of FIG. 1 in more detail. In the example of FIG. 2, processor 4 may represent any type of processing hardware, such as one or more central processing units (CPU), one or more field programmable gate arrays (FPGAs), one or more application specific integrated circuits (ASICs) or any other type of processing hardware. In some instances, processor 4 may execute instructions (or software) stored to a non-transitory computer-readable storage medium, which may cause processor 4 to perform the techniques described in this disclosure. The instructions may be stored in the form of a computer program or product, which may be referred to as a driver or graphics driver in the context of the techniques described in this disclosure.

GPU 6 may, as noted above, represent any form of processing hardware that is designed for performing graphical processing operations. Although not shown in the example of FIG. 2, GPU 6 may include a graphics processing pipeline having a geometry unit, a tiling unit and a rasterizer pixel shader unit. In some examples, GPU 6 may include a number of hardware units formed in a pipelined architecture. This pipelined architecture may be adapted in various ways to perform multiple passes. For example, the graphics pipeline represented by GPU 6 may be configured to perform a binning or tiling pass as a first pass of a multi-pass rendering process. This same graphics pipeline may then be configured to perform a rendering pass of the multi-pass rendering process, where one or more tiles are rendered to output rendered tiles to frame buffer 10 (shown in the example of FIG. 1).

As shown in the example of FIG. 2, processor 4 may execute software in the form of operating system (O/S) 30 ("O/S 30"). Operating system 30 may provide an execution environment in which one or more of applications (apps) 32A-32N ("apps 32") may execute. Applications 32 may each represent a software program or product that is developed by software engineers or programmers to provide some form of functionality or entertainment. Applications 32 may represent any type of computer program, including video games, spreadsheet applications, word processing applications, document viewing applications, task or organizer applications, and the like. Applications 32 may, in the context of a mobile device (such as so-called "smart phones") comprise discrete applications, referred to commonly as "apps," that are available for download via dedicated application stores (often of the so-called "walled garden" variety).

Operating system 30, in providing the execution environment in which applications 32 execute, may expose an interface by which applications 32 may interface with the underlying hardware of device 2. Given the large variety of underlying hardware components and the different combinations of such hardware components, operating systems often feature an extensible way by which to load interfaces by which applications 32 may interact with the particular hardware present in any given device. That is, operating system 30 may provide a way by which hardware vendors that design hardware may load a discrete software module into operating system 30. This discrete software module may be referred to as a "driver," where this driver may, when loaded into operating system 30, enable operating system 30 to expose an interface by which applications 30 may interact with the hardware component.

In the example of FIG. 2, operating system 30 is shown as having loaded GPU driver 22. GPU driver 22 may perform various aspects of the techniques described in this disclosure. To perform the techniques described in this disclosure, GPU driver 22 may include adaptive stream pre-processing module 34. Adaptive stream pre-processing module 34 may represent a module or unit configured to adaptively identify rendering inefficiencies that may result upon execution of a command stream 35 by GPU 6. One or more of apps 32 and/or operation system 30 may generate command stream 35 in the manner described above.

Adaptive stream pre-processing module 34 may include a stream analyzer 36, a graph analyzer 38, a stream optimizer 40 and a mode selection module 42. Stream analyzer 36 represents a module and/or unit configured to buffer command stream 35 and analyze buffered command stream 35 to generate a data structure representative of the one or more render targets and the dependencies between the render targets. While stream analyzer 36 may generate any type of data structure capable of generating this representation, stream analyzer 36 may generate a particular type of data structure referred to as a graph data structure. The graph data structure may represent the one or more render targets as nodes of the graph data structure and any dependencies between the render targets as edges of the graph data structure. Although described in this disclosure with respect to a particular graph data structure, the techniques may be implemented with respect to any type of data structure capable of representing the command stream in a manner than enables identification of rendering inefficiencies.

Graph analyzer 38 may represent a module or unit configured to identify the one or more rendering inefficiencies. Graph analyzer 38 may traverse the graph data structure to identify the one or more rendering inefficiencies that will occur upon execution of command stream 35 by GPU 6. Stream optimizer 40 represents a module or unit configured to reduce or possibly eliminate the rendering inefficiencies identified by graph analyzer 38. Stream optimizer 40 may, as one example, re-order various commands in command stream 35 to avoid tile-based rendering inefficiencies, as described in more detail below with respect to FIGS. 4A, 4B.

Mode selection module 42 represents a module or unit configured to identify a rendering mode by which GPU 6 is to render the primitives or objects specified in command stream 35. That is, mode selection module 42 may be configured to, as one example, determine whether GPU 6 should render command stream 35 according to a tile-based rendering mode or a direct rendering mode. In this respect, mode selection module 42 may, based on the representation of the render targets, e.g., the graph data structure described above, determine a rendering mode by which to render the render targets with the GPU.

In operation, GPU driver 22 may receive command stream 35 from operating system 30, which may have been generated by one or more of apps 32. GPU driver 22 may invoke adaptive stream pre-processing module 34, which may operate to provide the DDI stream optimizer described above that may reorder commands in DDI streams so as to remove sub-optimal ordering of commands in the DDI stream (which is shown as "command stream 35" in the example of FIG. 2). Adaptive stream pre-processing module 34 may buffer command stream 35 in real-time or near-real-time and invoke stream analyzer 36 to generate the scene graph data structure based on buffered command stream 35. Stream analyzer 36 may generate the above described graph data structure, passing this data structure to both stream optimizer 40 and mode selection module 42. Stream optimizer 40 may analyze the graph data structure to identify any inefficiency that may impact the performance of GPU 6 when executing the commands of command stream 35.

Stream optimizer 40 may analyze the graph data structure by traverse the graph data structure to identify the one or more rendering inefficiencies that will occur upon execution of command stream 35 by GPU 6. Stream optimizer 40 may re-order one or more commands in command stream 35 so as to reduce the identified inefficiencies that will occur upon execution of command stream 35 by GPU 6. GPU 6 may then execute re-ordered command stream 45 to render one or more images, one or more scenes or one or more frames.

In other instances, mode selection module 42 may, based on the representation of the render targets (e.g., the graph data structure in this example), determine whether to execute the command stream in a direct rendering mode or a tile-based rendering mode with GPU 6. Mode selection module 42 may perform some analysis, for example, of the graph data structure to determine whether there are a number of large objects, which may result in substantial overdraw should GPU 6 perform direct rendering. Mode selection module 42 may determine an overdraw percentage and compare this overdraw percentage to a threshold percentage so as to determine whether a direct rendering mode or a tile-based rendering mode should be used when rendering command stream 35. In any event, mode selection module 42 may determine, when there are a number of large objects, to render the scene using a tile-based rendering mode, as tile-based rendering modes may reduce or potentially eliminate overdraw. Mode selection module 42 may then configure GPU 6 to operate in the tile-based rendering mode. GPU 6 may then execute the command stream in the determined rendering mode.

Additionally, stream optimizer 40 may, when no inefficiencies are identified based on the graph data structure, disable the analysis of command streams generated from a corresponding one of apps 32 and/or operating system 30, disable the identification of the one or more rendering inefficiencies and disable the re-ordering of the one or more commands in those command streams. In other words, stream optimizer 40 may adaptively determine when to perform the techniques described in this disclosure based on previous application of the techniques described in this disclosure. In some instances, stream optimizer 40 may create application profiles 44A-44N ("application profiles 44" or "app profiles 44"). Application profiles 44 may each represent data that specifying rendering efficiency data and configuration data. In some instances, mode selection module 42 may update application profiles 44 to further include data specifying a rendering mode to be used when rendering command streams from those applications 32.

As one example, stream optimizer 40 may, upon determining that no inefficiencies will occur upon execution of the command stream by the GPU, store one of application profiles 44, which may include data indicating that the analysis of the command stream 35 has been disabled for a corresponding one of applications 32 that generated command stream 35. Upon receiving a second command stream that is also generated by the one of applications 32, adaptive stream pre-processing module 34 may accessing the one of application profiles 44 to determine whether to perform the analysis of this second command stream. Adaptive stream pre-processing module 34 may then determine, based on the one of application profiles 44, that the analysis of this second command stream has been disabled, where adaptive stream pre-processing module 34 may then forward the second command stream to GPU 6 without performing the analysis of the second command stream.

In this respect, stream optimizer 40 may, based on previous application of the optimizing techniques described in this disclosure with respect to a particular one of applications 32, stores a preference for performing the optimization techniques. Thus, for applications developed and/or optimized for a tile-based GPUs, such as GPU 6, stream optimizer 40 may "learn" of this optimization based on a previous application of the optimization techniques and store this learned information to a corresponding one of application profiles 44. When receiving commands from operating system 30 executing the one of applications 32, stream optimizer 40 may access a corresponding one of application profiles 44 and determine, based on this one of profiles 44, whether to enable analysis of the command stream and subsequent aspects of the techniques. Likewise, mode selection module 42 may access a corresponding one of application profiles 44 to determine whether a preference has been configured for a rendering mode when executing the command stream from the one of applications 32.

In this manner, the techniques described in this disclosure may promote better rendering by GPUs that support tile-based rendering modes (e.g., GPU 6). Given the identification of rendering inefficiencies, the techniques may leverage past knowledge regarding stream optimization with respect to various applications to gather data that may facilitate further rendering of command streams from those applications, storing this data in the form of application profiles 44. Application profiles 44 may store any type of information regarding the applications and rendering of graphical content, including information describing rendering inefficiencies, rendering inefficiency statistics and the like, which may be used in conjunction with other statistics to determine whether or not to enable or disable various aspects of the techniques described in this disclosure. In some examples, application profiles 44 may be provided or otherwise collected by application programmers so that application programmers may be better informed of rendering inefficiencies, where such reporting may include device statistics describing the type of operating system, type of device, etc. to further enable troubleshooting of the source of such rendering inefficiencies.

Figure 3:
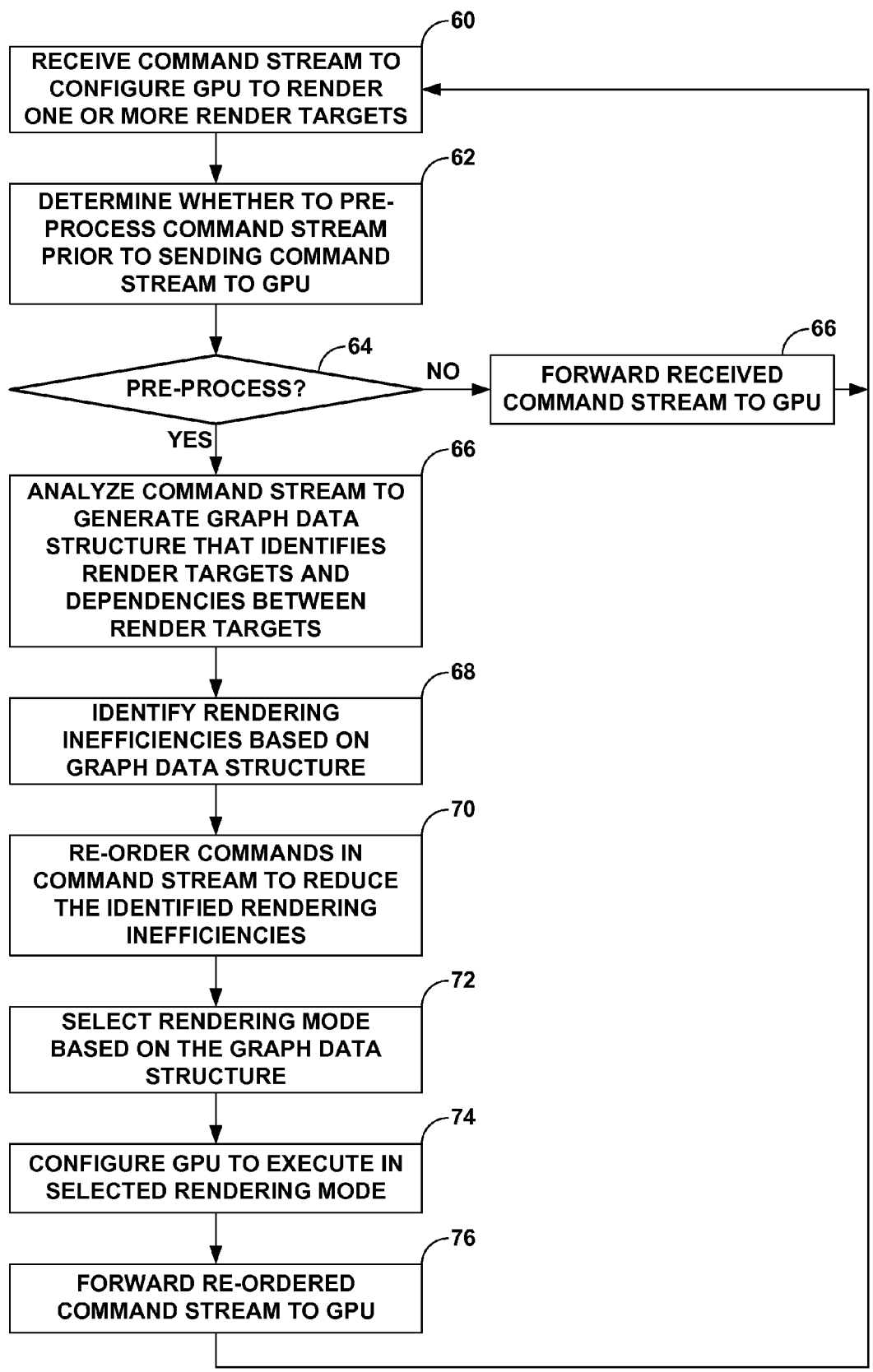
FIG. 3 is a flowchart illustrating example operation of a graphics processing unit driver in implementing the stream optimization techniques described in this disclosure.

FIG. 3 is a flowchart illustrating example operation of a graphics processing unit driver, such as GPU driver 22 shown in the example of FIG. 2, in implementing the stream optimization techniques described in this disclosure. Initially, GPU driver 22 may receive command stream 35 that configures GPU 6 to render one or more render targets (60). In response to receiving command stream 35, GPU driver 22 may invoke adaptive stream pre-processing module 34.

Adaptive stream pre-processing module 34 may, once invoked, determine whether to pre-process command stream 35 prior to sending command stream 35 to GPU 6 (62). To determine whether to pre-process command stream 35, adaptive stream pre-processing module 34 may determine whether one of application profiles 44 correspond to the one of applications 32 or operating system 30 that generated command stream 35. Adaptive stream pre-processing module 34 may generate application profiles 44 for each of applications 32 upon applications 32 being invoked or otherwise executed by processor 4, where adaptive stream pre-processing module 34 may delete or otherwise remove the corresponding one of application profiles 44 once the one of applications 32 is closed or execution is terminated. Application profiles 44, in this instance, may not be stored or otherwise maintain application profiles 44 in a persistent matter.

In this example, if the one of applications 32 that generated command stream 35 is not associated with one of application profiles 44, adaptive stream pre-processing module 34 may create a new one of application profiles 44, associate this new one of application profiles 44 with the one of applications 32 and determine that pre-processing of command stream 35 should be performed ("YES" 64). However, if the one of applications 32 has been executing for some amount of time and has previously sent a command stream to GPU driver 22, adaptive stream pre-processing module 34 may retrieve the corresponding one of application profiles 44 and determine whether to perform pre-processing based on this one of application profiles 44.

To retrieve the corresponding one of application profiles 44, adaptive stream pre-processing module 34 may determine a process identifier (which is often abbreviated as "PID") associated with the one of applications 32 that generated command stream 35. Typically, operating system 30 assigns a PID when operating system 30 invokes or otherwise executes the one of applications 32, where the PID is assigned in a manner that uniquely identifies and thereby distinguishes the one of applications 32 from every other one of applications 32 executing in the user space provided by operating system 30. When generating application profiles 44, stream optimizer 40 of adaptive stream pre-processing module 34 may associate each of application profiles 44 with the PID of each of application s 32, thereby effectively associating each of application profiles 44 with a corresponding one of applications 32. Operating system 30 may, when passing command stream 35 to GPU driver 22, provide this PID to GPU driver 22, which adaptive stream pre-processing module 34 may use to retrieve the appropriate one of application profiles 44.

The retrieved one of application profiles 44 may specify rendering inefficiency and/or rendering inefficiency statistics, among other application specific data, which adaptive stream pre-processing module 34 may utilize when determining whether to pre-process command stream 35. As one example, adaptive stream pre-processing module 34 may compare a number of rendering inefficiencies identified in the corresponding one of application profiles 44 to a threshold. If the number of rendering inefficiencies identified in the corresponding one of application profiles 44 does not exceed the threshold, adaptive stream pre-processing module 34 may determine that pre-processing of command stream 35 is not to be performed ("NO" 64). If pre-processing is not to be performed, GPU driver 22 may forward command stream 35 to GPU 6 (66), which may execute command stream 35 and return rendered objects or graphical data to the one of applications 32 that generated command stream 35.

However, if the number of rendering inefficiencies identified in the corresponding one of application profiles 44 does not exceed the threshold, adaptive stream pre-processing module 34 may determine that pre-processing of command stream 35 is to be performed ("YES" 64). In this instance, adaptive stream pre-processing module 34 may invoke stream analyzer 36. Stream analyzer 36 may analyze command stream 35 to generate a graph data structure that identifies render targets and dependencies between render targets (66). Adaptive stream pre-processing module 34 may then, upon stream analyzer 36 returning the graph data structure, invoke graph analyzer 38. Graph analyzer 38 may identify rendering inefficiencies based on the graph data structure (68). Graph analyzer 38 may return the identified rendering inefficiencies to adaptive stream pre-processing module 34, which may invoke, in response to receiving these rendering inefficiencies, stream optimizer 40, providing the rendering inefficiencies to stream optimizer 40 along with command stream 35. Stream optimizer 40 may then re-order commands in command stream 35 to potentially reduce the number of identified rendering inefficiencies (70).

Adaptive stream pre-processing module 34 may also invoke mode selection module 42, which may select a rendering mode based on the graph data structure, and potentially command stream 35 and other data related to the analysis of command stream 35 (72). Mode selection module 42 may then interface with GPU 6 to configure GPU 6 to execute in the selected rendering mode (74). Stream optimizer 40 may, once GPU 6 has been configured to execute in the selected rendering mode, then forward re-ordered command stream 45 to GPU 6 for execution. GPU 6 may execute command stream 35 and return rendered objects or graphical data to the one of applications 32 that generated command stream 35.

Figure 4A:
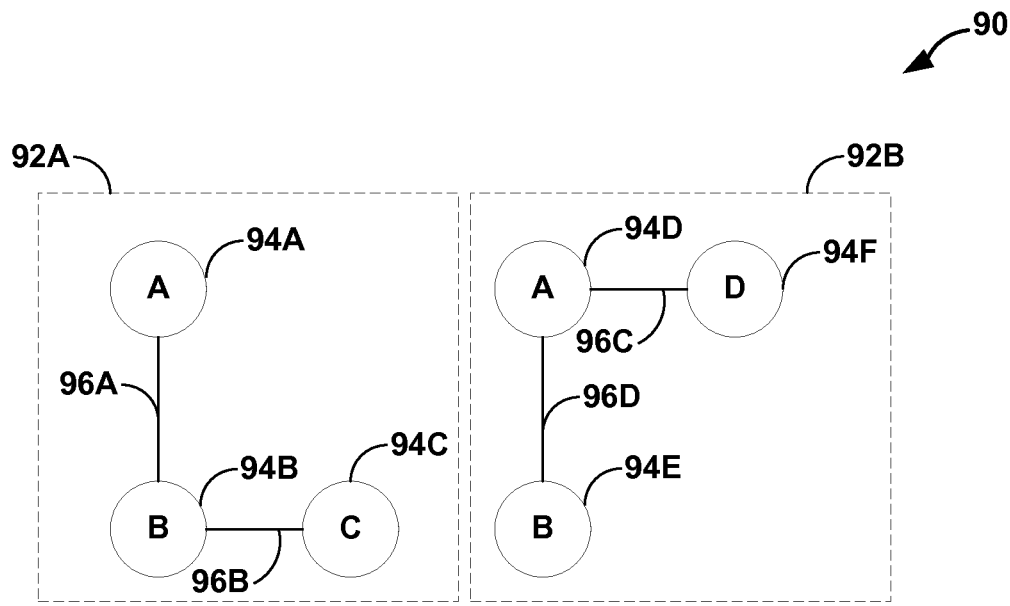
FIGS. 4A and 4B are diagrams illustrating an initial graph data structure and a re-ordered graph data structure, respectively, having been re-ordered in accordance with various aspects of the techniques described in this disclosure to potentially reduce rendering inefficiencies.
Figure 4B:
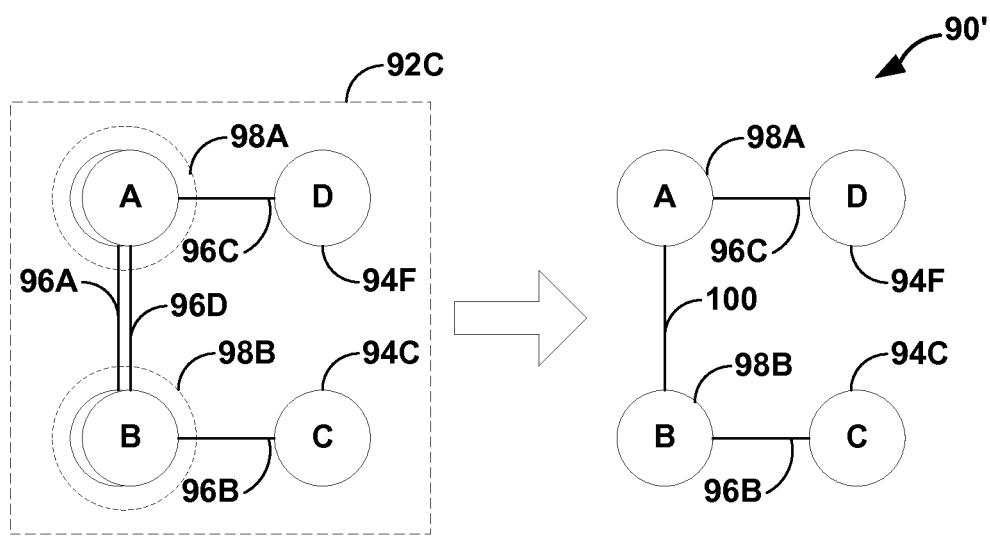

FIGS. 4A and 4B are diagrams illustrating an initial graph data structure 90 and a re-ordered graph data structure 90', respectively, having been re-ordered in accordance with various aspects of the techniques described in this disclosure to potentially reduce rendering inefficiencies. Referring first to FIG. 4A, graph data structure 90 includes a first portion 92A and a second portion 92B. In the example of FIG. 4A, portion 92A includes three nodes denoted A, B and C, which may also be referred to as nodes 94A-94C. Each of nodes 94A-94C store state data for render targets A, B and C, respectively. Node 94B includes state data that is dependent upon state data stored to node 94A, where such dependency is reflected as edge 96A. Likewise, node 94C includes state data that is dependent upon state data stored to node 94B, where such dependency is reflected as edge 96B.

In other words, stream analyzer 36 may construct graph data structure 90 based on command stream 35, where command stream 35 defines three render targets A, B and C. Command stream 35 may specify these render targets A, B and C in such a manner that some state data used to render target A is reused when rendering render target B and some state data used to render target B is reused when rendering render target C. Stream analyzer 36 may identify these dependencies and form portion 92A of graph data structure 90, where render targets A-C are represented by nodes 94A-94C that store the respective state data for rendering render targets A-C and the dependencies are represented by edges 96A, 96B of portion 92A.

Portion 92B also includes three nodes denoted A, B and D, which may also be referred to as nodes 94D-94F. Nodes 94D-94F store state data for rendering render targets A, B and D, respectively. In this example, render targets A and B have two separate command or command sequences in command stream 35 for rendering targets A and B. In portion 92B, state data for render target A stored to node 94D is reused when rendering render target D (as represented by node 94F), where this dependency is reflected in graph data structure 90 as edge 96C. Also, in portion 92B, render target B reuses state data used for rendering render target A, where this dependency is reflected as edge 96D in example portion 92B of graph data structure 90. Similar to that described above with respect to portion 92A, stream analyzer 36 may process command stream 35 to generate portion 92B. After generating graph data structure 90, stream analyzer 36 passes graph data structure 90 to graph analyzer 38.

Graph analyzer 38 may identify rendering inefficiencies present in graph data structure 90 in the manner described above. To illustrate, consider graph data structure 90, where portion 92A is separate from portion 92B (meaning that no edge connects any of nodes 94A-94C to any of nodes 94D-94F). Given this separation, graph analyzer 38 may determine that there are no dependencies between nodes 94A-94C and nodes 94D-94F. As a result of these lack of dependencies, graph analyzer 38 may attempt to identify common nodes between portion 92A and portion 92B, where common nodes may refer to nodes 94A-94C of portion 92A that define state data for the same render target as any one of nodes 94D-94F. In the example of FIG. 4A, graph analyzer 38 may identify node 94A, 94D as common nodes that both define state data for render target A. Graph analyzer 38 may also identify nodes 94B, 94E as common nodes that both define state data for render target B. Accordingly, graph analyzer 38 may determine that these common nodes may be combined, thereby merging portions 92A and 92B to form portion 92C shown in the example of FIG. 4B.

In the example of FIG. 4B, graph analyzer 38 may effectively identify that nodes 92A, 92D can be merged to reduce rendering inefficiencies, where the left-hand side of FIG. 4B shows this merger as merged nodes 98A. Graph analyzer 38 may also identify that nodes 92B, 92E can be merged to reduce rendering inefficiencies, where the left-hand side of FIG. 4B shows this merger as merged nodes 98B. Merging these nodes in this manner may reduce rendering inefficiencies for reasons discussed above.

In summary, a tile based GPU, such as GPU 6, may have insufficient on-chip memory to store all state data for a given scene. As a result, state data for each rendering target may need to be moved from off-chip memory to on-chip memory, which may delay rendering due to memory bus limitations. Command stream 35, as depicted in the example of FIG. 4A as graph data structure 90, would have, according to portion 92A, resulted in rendering target A, then target B, followed by target C, and then would have, according to portion 92B, resulted in rendering target A once again, followed by target B once again and then followed by target D. Re-rendering targets A and B would have resulted in unnecessary off-chip memory accesses given that there are no dependencies that require rendering of target A and target B in two separate rendering instances (i.e., there is no dependencies between portions 92A and 92B in the example of FIG. 4A that requires rendering these targets A and target B in the above noted inefficient order).

Graph analyzer 38 may identify these rendering inefficiencies, merging nodes 94A, 94D and nodes 94B, 94E to produce re-ordered graph data structure 90', which is shown on the right-hand side of FIG. 4B. Re-ordered graph data structure 90' includes merged node 98A, 98B and nodes 94F and 94C. Edges 96A and 96D are merged when constructing re-ordered graph data structure 90 to form edge 100, while edges 96C and 96B remain as originally defined. Graph analyzer 38 may pass re-ordered graph data structure 90' to stream optimizer 40, which may re-order commands in command stream 35 to form optimized command stream 45 based on re-ordered graph data structure 90'. That is, stream optimizer 40 may re-order commands for rendering target A and target B to merge these commands in a manner similar to that shown with respect to the portion 92C of graph data structure 90', while also re-ordering commands to render targets C and D to maintain the previously existing dependencies. In this manner, GPU driver 22 may optimize command streams to potentially optimize command stream 35 to output command stream 45 to GPU 6.

FIG. 5 is a block diagram illustrating a developer environment 110 that may perform the techniques described in this disclosure. Developer environment 110 includes a device 112 that is similar to device 2 shown in the example of FIG. 1. Device 112 is similar to device 2 in that it includes similar components, where these similar components have been denoted using the same reference numerals. However, rather than include a GPU driver 22, device 2 stores and executes developer platform 114. Developer platform 114 may represent one or more software programs used to develop software programs or software program products. Developer platform 114 may include a word processor (or other program by which to write instructions often using some form of a high-level programming language, such as C++), a compiler, a linker, and other developer software tools commonly used for developing software.

As shown in the example of FIG. 5, developer platform 114 may include a GPU library 116 used for developing graphical elements for software programs. GPU library 116 may include or otherwise enable device 2 to perform various aspects of the techniques described in this disclosure. That is, when compiling code or instructions that enable processor 4 to generate a command stream, developer platform 114 may invoke GPU library 116 that incorporates various aspects of the techniques described in this disclosure related to identifying rendering inefficiencies in the command stream. Thus, when compiling and subsequently executing this code or computer-readable instructions, developer platform 114 may perform the techniques described in this disclosure to identify these rendering inefficiencies and store errors, warning or other troubleshooting data related to the identified rendering inefficiencies. These errors, warning or other troubleshooting data may identify lines of the code or portions of the code and may enable developer platform 114 to highlight the code while also presenting the warnings to the developer.

In this way, the techniques may be deployed in a developer environment, such as developer environment 110. In other words, the techniques may be implemented as a shared library 116 that is incorporated into a development environment. Shared library 116 may, in the developer context, generate one or more notifications alerting a developer of the identified one or more inefficiencies so that developers may become more aware of these inefficiencies. The notification may also alert a user as to whether it is more beneficial to use a direct render mode or a tile-based render mode.

In this manner, the techniques described in this disclosure may not only promote better rendering by GPUs that support tile-based rendering modes (e.g., GPU 6), but also in some ways educate developers as to better ways of coding applications to utilize GPUs that support tile-based rendering modes. The techniques may, therefore, promote improved rendering efficiencies both pro-actively (e.g., during the application development process) and reactively (e.g., during execution of the application). In some instances, the techniques may adaptively (meaning, without requiring direct user intervention) perform this rendering target analysis on an application-by-application basis using the before mentioned profiles. Thus, where pro-active tile-based application development has resulted in few to any tile-based rendering inefficiencies, the techniques may adaptively disable post-development tile-based rendering analysis to promote reduced power consumption and rendering delay.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for analyzing a command stream that configures a graphics processing unit (GPU) to render a plurality of render targets, the method comprising:
   buffering the command stream, the command stream comprising a display device interface stream;
   analyzing the command stream to determine a representation of the plurality of render targets defined by the command stream, the representation of the plurality of render targets comprising a graph data structure that represents each of the plurality of render targets as a different node of the graph data structure and any dependencies between the render targets as edges of the graph data structure that interconnect two or more of the nodes of the graph data structure, and each of the plurality of render targets comprising one of a plurality of individual objects;
   based on a traversal of the graph data structure representative of the render targets, identifying one or more rendering inefficiencies that will occur upon execution of the command stream by the GPU; and
   re-ordering one or more commands in the command stream so as to reduce the identified rendering inefficiencies that will occur upon execution of the command stream by the GPU.

2. The method of claim 1, further comprising:
   based on the representation of the render targets, determining a rendering mode by which to render the render targets with the GPU;
   configuring the GPU to operate in the determined rendering mode; and
   executing the command stream in the determined rendering mode with the GPU.

3. The method of claim 2, wherein determining a rendering mode comprises determining whether to execute the command stream in a direct rendering mode or a tile-based rendering mode.

4. The method of claim 1, further comprising, when no inefficiencies that will occur upon execution of the command stream by the GPU are identified based on the representation of the plurality of render targets, disabling the analysis of the command stream, disabling the identification of the one or more rendering inefficiencies and disabling the re-ordering of the one or more commands in the command stream.

5. The method of claim 4, further comprising:
upon determining that no inefficiencies will occur upon execution of the command stream by the GPU, storing one of a plurality of application profiles that includes data indicating that the analysis of the command stream has been disabled for a corresponding application that generated the command stream, wherein the application profile is associated with the application that generated the command stream, and wherein the command stream comprises a first command stream generated by the application;
receiving a second command stream that is also generated by the application;
accessing the one of the plurality of application profiles associated with the application to determine whether to perform the analysis of the second command stream;
determining, based on the one of the plurality of application profiles, that the analysis of the command stream has been disabled; and
forwarding the second command stream to the GPU without performing the analysis of the second command stream, the identification of the one or more rendering inefficiencies and the re-ordering of the one or more commands in the second command stream.

6. The method of claim 1, further comprising:
forwarding the re-ordered command stream to the GPU;
generating, with the GPU, rendered image data rendered in accordance with the re-ordered command stream; and
presenting the rendered image data.

7. The method of claim 1,
wherein analyzing the command stream comprises analyzing the command stream with a graphics driver to determine the representation of the plurality of render targets defined by the command stream during execution of an application,
wherein identifying one or more rendering inefficiencies comprises identifying, based on the representation of the render targets, the one or more rendering inefficiencies with the graphics driver that will occur upon execution of the command stream by the GPU, and
wherein re-ordering the one or more commands comprises re-ordering the one or more commands in the command stream with the graphics driver so as to reduce the identified inefficiencies that will occur upon execution of the command stream by the GPU.

8. The method of claim 1,
wherein analyzing the command stream comprises analyzing the command stream with a graphics library operating in a developer environment to determine the representation of the plurality of render targets defined by the command stream during development of an application,
wherein identifying one or more rendering inefficiencies comprises identifying, based on the representation of the render targets, the one or more rendering inefficiencies with the graphics library that will occur upon execution of the command stream by the GPU, and
wherein re-ordering the one or more commands comprises re-ordering the one or more commands in the command stream with the graphics library so as to reduce the identified inefficiencies that will occur upon execution of the command stream by the GPU.

9. The method of claim 1, further comprising generating one or more notifications alerting a developer of the identified one or more rendering inefficiencies.

10. A device configured to analyze a command stream that configures a graphics processing unit (GPU) to render a plurality of render targets, the device comprising:
a memory configured to buffer the command stream, the command stream comprising a display device interface stream; and
one or more processors configured to analyze the command stream to determine a representation of the plurality of render targets defined by the command stream, the representation of the plurality of render targets comprising a graph data structure that represents each of the plurality of render targets as a different node of the graph data structure and any dependencies between the render targets as edges of the graph data structure that interconnect two or more of the nodes of the graph data structure, and each of the plurality of render targets comprising one of a plurality of individual objects, based on a traversal of the graph data structure representative of the render targets, identify one or more rendering inefficiencies that will occur upon execution of the command stream by the GPU, and re-order one or more commands in the command stream so as to reduce the identified rendering inefficiencies that will occur upon execution of the command stream by the GPU.

11. The device of claim 10, wherein the processor is further configured to, based on the representation of the render targets, determine a rendering mode by which to render the render targets with the GPU, configure the GPU to operate in the determined rendering mode, and execute the command stream in the determined rendering mode with the GPU.

12. The device of claim 11, wherein the processor is further configured to, when determining a rendering mode, determine whether to execute the command stream in a direct rendering mode or a tile-based rendering mode.

13. The device of claim 10, wherein the processor is further configured to, when no inefficiencies that will occur upon execution of the command stream by the GPU are identified based on the representation of the plurality of render targets, disable the analysis of the command stream, disable the identification of the one or more rendering inefficiencies and disable the re-ordering of the one or more commands in the command stream.

14. The device of claim 13,
wherein the processor is further configured to, upon determining that no inefficiencies will occur upon execution of the command stream by the GPU, store one of a plurality of application profiles that includes data indicating that the analysis of the command stream has been disabled for a corresponding application that generated the command stream, wherein the application profile is associated with the application that generated the command stream, and
wherein the command stream comprises a first command stream generated by the application, wherein the processor is further configured to receive a second command stream that is also generated by the application, access the one of the plurality of application profiles associated with the application to determine whether to perform the analysis of the second command stream, determine, based on the one of the plurality of application profiles, that the analysis of the command stream has been disabled, and forward the second command stream to the GPU without performing the analysis of the second command stream, the identification of the one or more rendering inefficiencies and the re-ordering of the one or more commands in the second command stream.

15. The device of claim 10,
wherein the processor is further configured to forward the re-ordered command stream to the GPU, and
wherein the device further includes the GPU that is configured to generate rendered image data rendered in accordance with the re-ordered command stream and present the rendered image data.

16. The device of claim 10,
wherein the processor is further configured to, when analyzing the command stream, analyze the command stream with a graphics driver to determine the representation of the plurality of render targets defined by the command stream during execution of an application,
wherein the processor is further configured to, when identifying one or more rendering inefficiencies, identify, based on the representation of the render targets, the one or more rendering inefficiencies with the graphics driver that will occur upon execution of the command stream by the GPU, and
wherein the processor is further configured to, when re-ordering the one or more commands, re-order the one or more commands in the command stream with the graphics driver so as to reduce the identified inefficiencies that will occur upon execution of the command stream by the GPU.

17. The device of claim 10,
wherein the processor is further configured to, when analyzing the command stream, analyze the command stream with a graphics library operating in a developer environment to determine the representation of the plurality of render targets defined by the command stream during development of an application,
wherein the processor is further configured to, when identifying one or more rendering inefficiencies, identify, based on the representation of the render targets, the one or more rendering inefficiencies with the graphics library that will occur upon execution of the command stream by the GPU, and
wherein the processor is further configured to, when re-ordering the one or more commands, re-order the one or more commands in the command stream with the graphics library so as to reduce the identified inefficiencies that will occur upon execution of the command stream by the GPU.

18. The device of claim 10, the processor is further configured to generate one or more notifications alerting a developer of the identified one or more rendering inefficiencies.

19. A device configured to analyze a command stream that configures a graphics processing unit (GPU) to render a plurality of render targets, the device comprising:
means for buffering the command stream, the command stream comprising a display device interface stream;
means for analyzing the command stream to determine a representation of the plurality of render targets defined by the command stream, the representation of the plurality of render targets comprising a graph data structure that represents each of the plurality of render targets as a different node of the graph data structure and any dependencies between the render targets as edges of the graph data structure that interconnect two or more of the nodes of the graph data structure, and each of the plurality of render targets comprising one of a plurality of individual objects;
means for, based on a traversal of the graph data structure representative of the render targets, identifying one or more rendering inefficiencies that will occur upon execution of the command stream by the GPU; and
means for re-ordering one or more commands in the command stream so as to reduce the identified rendering inefficiencies that will occur upon execution of the command stream by the GPU.

20. The device of claim 19, further comprising:
means for determining, based on the representation of the render targets, a rendering mode by which to render the render targets with the GPU;
means for configuring the GPU to operate in the determined rendering mode; and
means for executing the command stream in the determined rendering mode with the GPU.

21. The device of claim 20, wherein the means for determining a rendering mode comprises means for determining whether to execute the command stream in a direct rendering mode or a tile-based rendering mode.

22. The device of claim 19, further comprising means for disabling, when no inefficiencies that will occur upon execution of the command stream by the GPU are identified based on the representation of the plurality of render targets, the analysis of the command stream, the identification of the one or more rendering inefficiencies and disabling the re-ordering of the one or more commands in the command stream.

23. The device of claim 22, further comprising:
upon determining that no inefficiencies will occur upon execution of the command stream by the GPU, means for storing one of a plurality of application profiles that includes data indicating that the analysis of the command stream has been disabled for a corresponding application that generated the command stream, wherein the application profile is associated with the application that generated the command stream, and wherein the command stream comprises a first command stream generated by the application;
means for receiving a second command stream that is also generated by the application;
means for accessing the one of the plurality of application profiles associated with the application to determine whether to perform the analysis of the second command stream;
means for determining, based on the one of the plurality of application profiles, that the analysis of the command stream has been disabled; and
means for forwarding the second command stream to the GPU without performing the analysis of the second command stream, the identification of the one or more rendering inefficiencies and the re-ordering of the one or more commands in the second command stream.

24. The device of claim 19, further comprising:
means for forwarding the re-ordered command stream to the GPU;
means for generating rendered image data rendered in accordance with the re-ordered command stream; and
means for presenting the rendered image data.

25. The device of claim 19,
wherein the means for analyzing the command stream comprises means for analyzing the command stream with a graphics driver to determine the representation of the plurality of render targets defined by the command stream during execution of an application,
wherein the means for identifying one or more rendering inefficiencies comprises means for identifying, based on the representation of the render targets, the one or more rendering inefficiencies with the graphics driver that will occur upon execution of the command stream by the GPU, and wherein the means for re-ordering the one or more commands comprises means for re-ordering the one or more commands in the command stream with the graphics driver so as to reduce the identified inefficiencies that will occur upon execution of the command stream by the GPU.

26. The device of claim 19,
wherein the means for analyzing the command stream comprises means for analyzing the command stream with a graphics library operating in a developer environment to determine the representation of the plurality of render targets defined by the command stream during development of an application,
wherein the means for identifying one or more rendering inefficiencies comprises means for identifying, based on the representation of the render targets, the one or more rendering inefficiencies with the graphics library that will occur upon execution of the command stream by the GPU, and
wherein the means for re-ordering the one or more commands comprises means for re-ordering the one or more commands in the command stream with the graphics library so as to reduce the identified inefficiencies that will occur upon execution of the command stream by the GPU.

27. The device of claim 19, further comprising means for generating one or more notifications alerting a developer of the identified one or more rendering inefficiencies.

28. A non-transitory computer-readable storage medium having stored thereon instructions that, when executed cause, one or more processors to:
buffer the command stream, the command stream comprising a display device interface stream;
analyze the command stream to determine a representation of a plurality of render targets defined by the command stream, the representation of the plurality of render targets comprising a graph data structure that represents each of the plurality of render targets as a different node of the graph data structure and any dependencies between the render targets as edges of the graph data structure that interconnect two or more of the nodes of the graph data structure, and each of the plurality of render targets comprising one of a plurality of individual objects;
identify, based on a traversal of the graph data structure representative of the render targets, one or more rendering inefficiencies that will occur upon execution of the command stream by the GPU; and
re-order one or more commands in the command stream so as to reduce the identified rendering inefficiencies that will occur upon execution of the command stream by the GPU.

29. The non-transitory computer-readable storage medium of claim 28, further comprising instructions that, when executed, cause the one or more processors to:
based on the representation of the render targets, determine a rendering mode by which to render the render targets with the GPU;
configure the GPU to operate in the determined rendering mode; and
execute the command stream in the determined rendering mode with the GPU.

30. The non-transitory computer-readable storage medium of claim 29, wherein the instructions that, when executed, cause the one or more processors to determine a rendering mode comprises instructions that, when executed, cause the one or more processors to determine whether to execute the command stream in a direct rendering mode or a tile-based rendering mode.

31. The non-transitory computer-readable storage medium of claim 28, further comprising instructions that, when executed, cause the one or more processors to, when no inefficiencies that will occur upon execution of the command stream by the GPU are identified based on the representation of the plurality of render targets, disable the analysis of the command stream, disable the identification of the one or more rendering inefficiencies and disable the re-ordering of the one or more commands in the command stream.

32. The non-transitory computer-readable storage medium of claim 31, further comprising instructions that, when executed, cause the one or more processors to:
upon determining that no inefficiencies will occur upon execution of the command stream by the GPU, store one of a plurality of application profiles that includes data indicating that the analysis of the command stream has been disabled for a corresponding application that generated the command stream, wherein the application profile is associated with the application that generated the command stream, and wherein the command stream comprises a first command stream generated by the application;
receive a second command stream that is also generated by the application;
access the one of the plurality of application profiles associated with the application to determine whether to perform the analysis of the second command stream;
determine, based on the one of the plurality of application profiles, that the analysis of the command stream has been disabled; and
forward the second command stream to the GPU without performing the analysis of the second command stream, the identification of the one or more rendering inefficiencies and the re-ordering of the one or more commands in the second command stream.

33. The non-transitory computer-readable storage medium of claim 28, further comprising instructions that, when executed, cause the one or more processors to:
forward the re-ordered command stream to the GPU;
generate, with the GPU, rendered image data rendered in accordance with the re-ordered command stream; and
present the rendered image data.

34. The non-transitory computer-readable storage medium of claim 28,
wherein the instructions that, when executed, cause the one or more processors to analyze the command stream comprises instructions that, when executed, cause the one or processors to analyze the command stream with a graphics driver to determine the representation of the plurality of render targets defined by the command stream during execution of an application,
wherein the instructions that, when executed, cause the one or more processors to identify one or more rendering inefficiencies comprises instructions that, when executed, cause the one or more processors to identify, based on the representation of the render targets, the one or more rendering inefficiencies with the graphics driver that will occur upon execution of the command stream by the GPU, and
wherein the instructions that, when executed, cause the one or more processors to re-order the one or more commands comprises instructions that, when executed, cause the one or more processors to re-order the one or more commands in the command stream with the graphics driver so as to reduce the identified inefficiencies that will occur upon execution of the command stream by the GPU.

35. The non-transitory computer-readable storage medium of claim 28,
wherein the instructions that, when executed, cause the one or more processors to analyze the command stream comprises instructions that, when executed, cause the one or more processors to analyze the command stream with a graphics library operating in a developer environment to determine the representation of the plurality of render targets defined by the command stream during development of an application,
wherein the instructions that, when executed, cause the one or more processors to identify one or more rendering inefficiencies comprises instructions that, when executed, cause the one or more processors to identify, based on the representation of the render targets, the one or more rendering inefficiencies with the graphics library that will occur upon execution of the command stream by the GPU, and
wherein the instructions that, when executed, cause the one or more processors to re-order the one or more commands comprises instructions that, when executed, cause the one or more processors to re-order the one or more commands in the command stream with the graphics library so as to reduce the identified inefficiencies that will occur upon execution of the command stream by the GPU.

36. The non-transitory computer-readable storage medium of claim 28, further comprising instructions that, when executed, cause the one or more processors to generate one or more notifications alerting a developer of the identified one or more rendering inefficiencies.

* * * * *